United States Patent
Zagayevskiy et al.

(10) Patent No.: US 11,927,717 B2
(45) Date of Patent: Mar. 12, 2024

(54) OPTIMIZED METHODOLOGY FOR AUTOMATIC HISTORY MATCHING OF A PETROLEUM RESERVOIR MODEL WITH ENSEMBLE KALMAN FILTER (ENKF)

(71) Applicant: Landmark Graphics Corporation, Houston, TX (US)

(72) Inventors: Yevgeniy Zagayevskiy, Houston, TX (US); Hanzi Mao, College Station, TX (US); Harsh Biren Vora, Houston, TX (US); Hui Dong, Austin, TX (US); Terry Wong, Spring, TX (US); Dominic Camilleri, Katy, TX (US); Charles Hai Wang, Houston, TX (US); Courtney Leeann Beck, Denver, CO (US)

(73) Assignee: Landmark Graphics Corporation, Houston, TX (US)

( * ) Notice: Subject to any disclaimer, the term of this patent is extended or adjusted under 35 U.S.C. 154(b) by 708 days.

(21) Appl. No.: 17/047,152

(22) PCT Filed: May 9, 2018

(86) PCT No.: PCT/US2018/031794
§ 371 (c)(1),
(2) Date: Oct. 13, 2020

(87) PCT Pub. No.: WO2019/216892
PCT Pub. Date: Nov. 14, 2019

(65) Prior Publication Data
US 2021/0149077 A1 May 20, 2021

(51) Int. Cl.
*G01V 99/00* (2009.01)
*E21B 49/00* (2006.01)
(Continued)

(52) U.S. Cl.
CPC ............ *G01V 99/005* (2013.01); *E21B 49/00* (2013.01); *G06N 20/20* (2019.01); *G06Q 10/06* (2013.01);
(Continued)

(58) Field of Classification Search
CPC .......... G01V 99/005; G01V 2210/663; G01V 2210/665; G06N 20/20; E21B 49/00;
(Continued)

(56) References Cited

U.S. PATENT DOCUMENTS

| | | |
|---|---|---|
| 2011/0010142 A1 | 1/2011 | Ding et al. |
| 2012/0101786 A1 | 4/2012 | Hu et al. |

(Continued)

FOREIGN PATENT DOCUMENTS

WO 2015034539 A1 3/2015

OTHER PUBLICATIONS

Zhao, Yong, Albert C. Reynolds, and Gaoming Li. "Generating facies maps by assimilating production data and seismic data with the ensemble Kalman filter." SPE Symposium on Improved Oil Recovery. OnePetro, 2008. pp. 1-30. (Year: 2008).*

(Continued)

*Primary Examiner* — John E Johansen
(74) *Attorney, Agent, or Firm* — Kilpatrick Townsend & Stockton LLP

(57) ABSTRACT

A method for history matching a reservoir model based on actual production data from the reservoir over time generates an ensemble of reservoir models using geological data representing petrophysical properties of a subterranean reservoir. Production data corresponding to a particular time instance is acquired from the subterranean reservoir. Normal score transformation is performed on the ensemble and on the acquired production data to transform respective original distributions into normal distributions. The generated (Continued)

ensemble is updated based on the transformed acquired production data using an ensemble Kalman filter (EnKF). The updated generated ensemble and the transformed acquired production data are transformed back to respective original distributions. Future reservoir behavior is predicted based on the updated ensemble.

13 Claims, 4 Drawing Sheets

(51) Int. Cl.
| | |
|---|---|
| G06N 20/20 | (2019.01) |
| G06Q 10/06 | (2023.01) |
| G06Q 50/02 | (2012.01) |
| G06F 17/00 | (2019.01) |
| G06Q 10/04 | (2023.01) |

(52) U.S. Cl.
CPC .......... *G06Q 50/02* (2013.01); *E21B 2200/20* (2020.05); *G01V 2210/663* (2013.01); *G01V 2210/665* (2013.01); *G06F 17/00* (2013.01); *G06Q 10/04* (2013.01)

(58) Field of Classification Search
CPC .... E21B 2200/20; G06Q 10/06; G06Q 50/02; G06Q 10/04; G06F 17/00
USPC .......................................................... 703/10
See application file for complete search history.

(56) References Cited

U.S. PATENT DOCUMENTS

| | | |
|---|---|---|
| 2012/0265512 A1 | 10/2012 | Hu et al. |
| 2013/0124092 A1 | 5/2013 | Thorne |

OTHER PUBLICATIONS

Xu, Bohan, and Fahim Forouzanfar. "Reservoir rock and fluid characterization using distributed temperature sensing DTS systems data." SPE Europec featured at 79th EAGE Conference and Exhibition. OnePetro, 2017. pp. 1-20. (Year: 2017).*

Hakim-Elahi, S., and B. Jafarpour. "Inverting Injection-Induced Microseismic Monitoring Data with Coupled Flow and Geomechanical Models: Application to CO2 Injection." SPE Western Regional Meeting. OnePetro, 2018. pp. 1-14. (Year: 2018).*

International Search Report and Written Opinion for PCT application PCT/US2018/031794 dated Jan. 21, 2019, 7 pages.

* cited by examiner

OPTIMIZED METHODOLOGY FOR AUTOMATIC HISTORY MATCHING OF A PETROLEUM RESERVOIR MODEL WITH ENSEMBLE KALMAN FILTER (ENKF)

TECHNICAL FIELD OF THE INVENTION

The embodiments disclosed herein generally relate to methods and systems for characterizing a subsurface volume or formation, and, more particularly, to optimized methods and systems for automatic history matching of a petroleum reservoir model with Ensemble Kalman Filter (EnKF).

BACKGROUND OF THE INVENTION

History matching refers to the process of adjusting a model of a reservoir until it produces results that closely match historical data from the reservoir. Once the reservoir model predictions closely match historical data, the model is considered to be validated and can be used to make sound reservoir managerial decisions and production forecasts with confidence. The accuracy of history matching depends on the quality of the reservoir model and the quality and quantity of geologic data and production data, including oil and water production rates, bottomhole pressures, formation permeability, and the like.

Current approaches for assimilating both geologic data and production data to produce accurate model forecasts employ Ensemble Kalman Filter (EnKF) based automatic history matching. The EnKF is generally well known in the art and is detailed, for example, in a paper by Aanonsen, S. I. et al. entitled "The Ensemble Kalman Filter in Reservoir Engineering—A Review", SPE Journal 14(3) (September 2009) 393-412, which is incorporated herein by reference. An EnKF-based history matching can be used to assimilate both geologic and production data and quantify uncertainty associated with the predicted or forecasted reservoir behavior. However, the EnKF approach is computationally intensive, hence expensive, both at the forecast step and the model updating step of automatic history matching. Also, the data used to update the model has to be screened and pre-processed in order to provide the best predictions of reservoir behavior and properties.

What is needed, therefore, is an optimized approach that can reduce the computational cost of the model updating step in EnKF-based history matching.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

Figure 1:
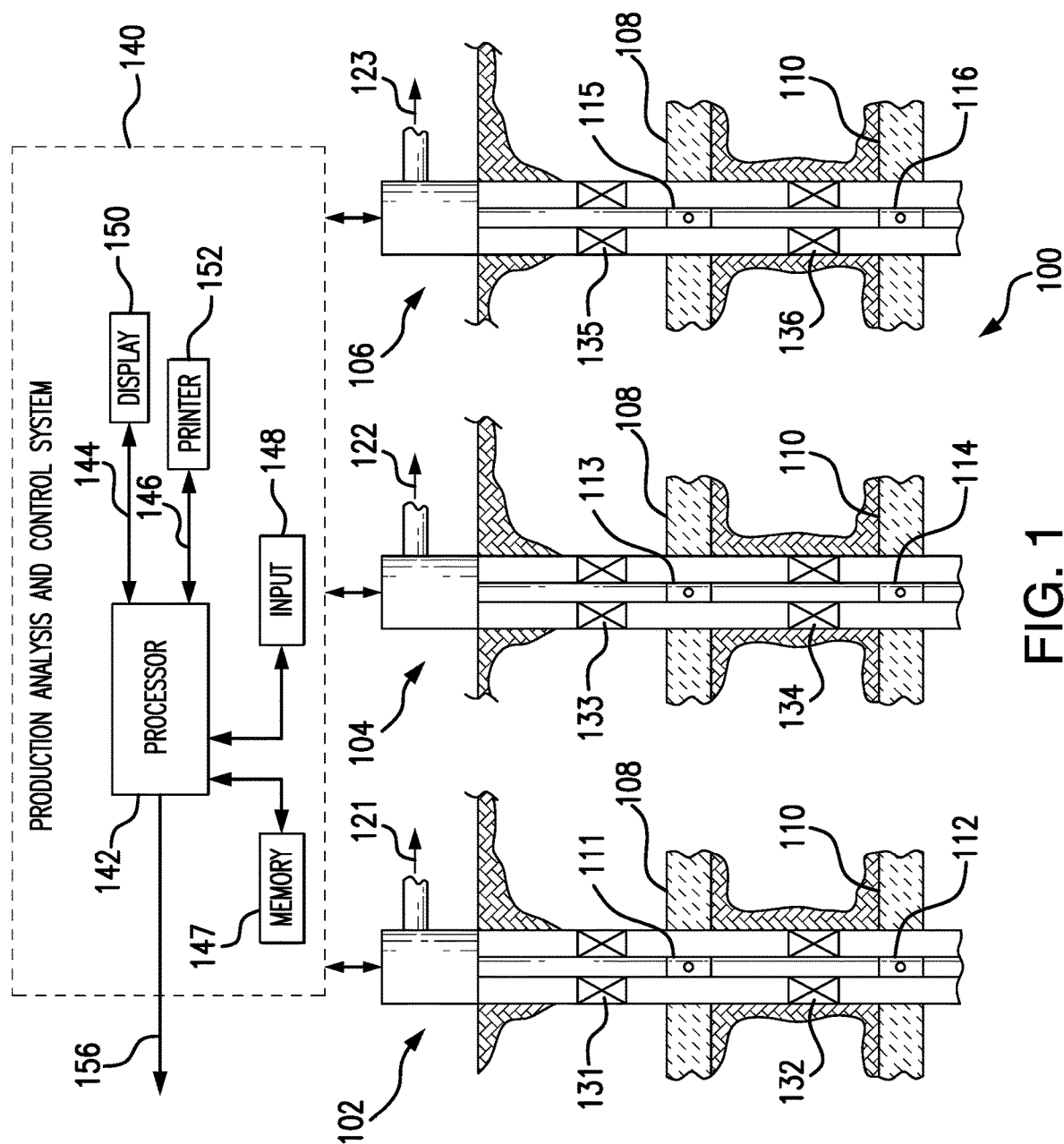
FIG. 1 illustrates a production analysis and control system and method therefor embodying principles of the present invention.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

A Kalman filter operates recursively on streams of noisy input data where the noise is represented by a covariance matrix to produce a statistically optimal estimate of the underlying system state. An EnKF is a Monte Carlo approximation of the Kalman filter and was developed for use with large problems. Given a probability density function ("pdf") of the state of a modeled system (i.e., the "prior," or the forecast in geoscience) and the data likelihood, Bayes theorem is used to obtain the pdf after the data likelihood has been taken into account (i.e., the "posterior," or the analysis in geoscience). This is often referred to as a Bayesian update. The EnKF represents the distribution of the system state using a collection of state vectors, called an "ensemble," and replaces the Kalman covariance matrix with a sample covariance computed from the ensemble. The ensemble is operated as if it was a random sample, but the ensemble members are truly not independent because the EnKF ties them together. The advantages of the EnKF include: 1) the EnKF incrementally updates reservoir models assimilating production data sequentially with time as data becomes available, thus it is ideally suited for real-time applications; 2) an ensemble of reservoir models that reflects the most current production data is always maintained and thus the performance predictions and uncertainty quantification are always available for optimization study; 3) the EnKF can be implemented using parallel or distributed computing and is therefore computationally fast; 4) no complicated coding is needed to apply the EnKF; and 5) no optimization or sensitivity coefficients need to be calculated to apply the EnKF.

As noted above, however, conventional EnKF-based approaches for automatic history matching are not computationally efficient. The computational inefficiency can be mitigated by utilizing distributed computing power in the forecast step to simulate well behavior using the reservoir model or by replacing full computer simulations with a proxy model. Reducing the cost of the updating step, however, as well as increasing its accuracy, requires more creative solutions. To address the latter challenges, embodiments of the present invention provide several improvements to conventional EnKF-based automatic history matching.

One improvement involves use of a weighting function. Conventionally, the model updating step is performed by calculating a Kalman gain based on the sample covariance matrix mentioned earlier. In accordance with some embodiments, a weighting function may be employed to stabilize the sample covariance matrix. Another improvement includes utilizing a time-dependent grid block retaining function to choose which part of the reservoir model should be updated locally around the well to reduce the computational time of the updating step. Yet another improvement involves using a coefficient of variation (CV). The coefficient of variation is employed in some embodiments as a data selection criterion to select only appropriate production data for incorporation into the reservoir model so as to avoid model contamination. Still another improvement provided by embodiments of the present invention includes using a normal score transformation (NST) procedure. In EnKF, it is assumed the data provided has a Gaussian distribution (i.e., a normal distribution). The NST procedure may be used to transform the production data so it closely resembles a normal distribution in order to obtain reasonable characterization results and predictions of future reservoir behavior (e.g., with respect to bottomhole pressures, oil and water production rates, formation permeability, etc.). The foregoing improvements help reduce the computational load on well production analysis and control systems performing history matching, particularly during real-time operation. Furthermore, these improvements also substantially increase the quality of the history matching performed by the production analysis and control systems.

Representatively illustrated in FIG. 1 is an oilfield 100 in which a production analysis and control system and method therefor embodying principles of the present invention may be used. In the following description of the embodiments disclosed herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The oilfield 100 has several production wells 102, 104, 106 as depicted in FIG. 1. However, it is to be understood that the oilfield 100 depicted in FIG. 1 is merely an example of a wide variety of oilfields in which systems and method incorporating principles of the present invention may be used. Other oilfield examples may include a greater or fewer number of wells, the wells including one or more injection wells, production wells, and the like. Thus, the principles of the present invention may be used with oilfields having only one well producing hydrocarbon from one reservoir via one formation zone intersected by the well, a large number of wells producing hydrocarbon from multiple reservoirs, or combinations thereof.

As depicted in FIG. 1, each of the wells 102, 104, 106 intersects two hydrocarbon reservoirs 108, 110. Two production valves or chokes are used in each well to regulate production from the individual reservoirs. That is, well 102 includes valves 111 and 112 to regulate production from reservoirs 108, 110, respectively; well 104 includes valves 113, 114 to regulate production from reservoirs 108, 110, respectively; and well 106 includes valves 115, 116 to regulate production from reservoirs 108, 110, respectively. Furthermore, production logging tools 131-136, each having one or a plurality of sensors thereon, are used to acquire production data from the individual reservoirs. More specifically, well 102 includes tools 131 and 132 to acquire production data from reservoirs 108, 110, respectively; well 104 includes tools 133, 134 to acquire production data from reservoirs 108, 110, respectively; and well 106 includes tools 135, 136 to acquire production data from reservoirs 108, 110, respectively. Production logging tools 131-136 generate respective production data outputs.

In FIG. 1, the production data output from well 102 is designated 121, the production data output from well 104 is designated 122, and the production data output from well 106 is designated 123. These production data outputs 121, 122, 123 may include parameters such as production rate of oil, production rate of gas, production rate of water, oil quality, gas quality, etc., which may be acquired by the production logging tools 131-136. Such parameters are indicative of the hydrocarbon produced from production wells. Of course, other parameters, and greater or fewer numbers of parameters, may be used to indicate a well's production in embodiments of the present invention, depending on the type of well. For example, the data output of an injection well may include parameters such as injection rate, steam temperature, bottom-hole pressure, and other types of data output. The above types of data output and other types of data output discussed herein are sometimes also referred to as "well output."

It will be readily appreciated that the well outputs 121, 122, 123 may be changed by varying the positions of the valves 111, 112, 113, 114, 115, 116. For example, by decreasing the flow area through the valve 111, production from the reservoir 108 in the well 102 may be decreased, and by increasing the flow area through the valve 112, production from the reservoir 110 in the well 102 may be increased.

However, since production from the reservoir 108 in any of the wells 102, 104, 106 influences production from the same reservoir 108 in the other wells, and production from the reservoir 110 in any of the wells 102, 104, 106 influences production from the same reservoir 110 in the other wells, the outputs 121, 122, 123 of the wells are interrelated in a very complex manner. In addition, production rates from each of the reservoirs 108, 110 should be maintained within prescribed limits to prevent damage to the reservoirs, while ensuring efficient and economical operation of the wells 102, 104, 106.

Referring still to FIG. 1, a production analysis and control system 140 for predicting reservoir behavior is shown having a prescribed set of geology and production mechanics models to which the optimized history matching principles disclosed herein may be applied. The production analysis and control system 140 includes a device generally referred to herein as a processor 142 and comprising any suitable commercially available computer, controller, or data processing apparatus having a processor. A memory device 147 is coupled to or otherwise accessible by the processor 142 and contains a set of instructions for carrying out the method and apparatus as further described herein. Processor 142 receives input information and/or commands, for instance, from any suitable input device or devices 148. Input device or devices 148 may include a keyboard, keypad, pointing device, or the like, further including a network interface or other communications interface for receiving input information from a remote computer or database. Still further, processor 142 outputs information signals and/or equipment control commands Output signals can be output to a display device 150 via signal lines 144 for use in generating a display of information contained in the output signals. Output signals can also be output to a printer device 152 via signal lines 146. Information and/or control signals may also be output via signal lines 156 as necessary, for example, to a remote device for use in controlling one or more various production operating parameters, further as discussed herein.

Processor 142 is programmed for performing functions as described herein, using programming techniques known in the art. In one embodiment, a computer readable medium is included, the computer readable medium having a computer program stored thereon. The computer program, when executed by processor 142, helps predict the performance of reservoirs 108, 110 by, among other things, performing history matching of the production from the reservoirs. To this end, the computer program includes instructions for generating a series or "ensemble" of reservoir models (which may number in the hundreds) using geological data representing petrophysical properties of a subterranean reservoir, and for acquiring production data corresponding to an initial assimilation instance from the subterranean reservoir. The computer program also includes instructions for performing normal score transformation on the ensemble of reservoir models to transform the original distribution of the ensemble of reservoir models into a normal distribution of the ensemble of reservoir models, and for performing normal score transformation on the acquired production data to transform the original distribution of the acquired production data into a normal distribution of the acquired production data. The computer program further includes instructions for updating the generated ensemble of reservoir models based on the transformed acquired production data using an EnKF process. The computer program additionally includes instructions for transforming the updated generated ensemble of reservoir models back to the original distribution of the ensemble, for transforming the acquired production data back to the original distribution of the acquired production data, and for predicting future reservoir behavior based on the updated ensemble. The programming of the computer program for execution by processor 142 may further be accomplished using known programming techniques for implementing the embodiments as described and discussed herein. Still further, the production operation can be advantageously optimized in conjunction with knowledge of a predicted performance of the subterranean reservoir(s), as discussed further herein below.

In a preferred embodiment, the geological data includes at least permeability data. In an alternate embodiment, the geological data may further include any of the following: log data, lithology data, porosity data, shale plasticity data, and the like.

Figure 2:
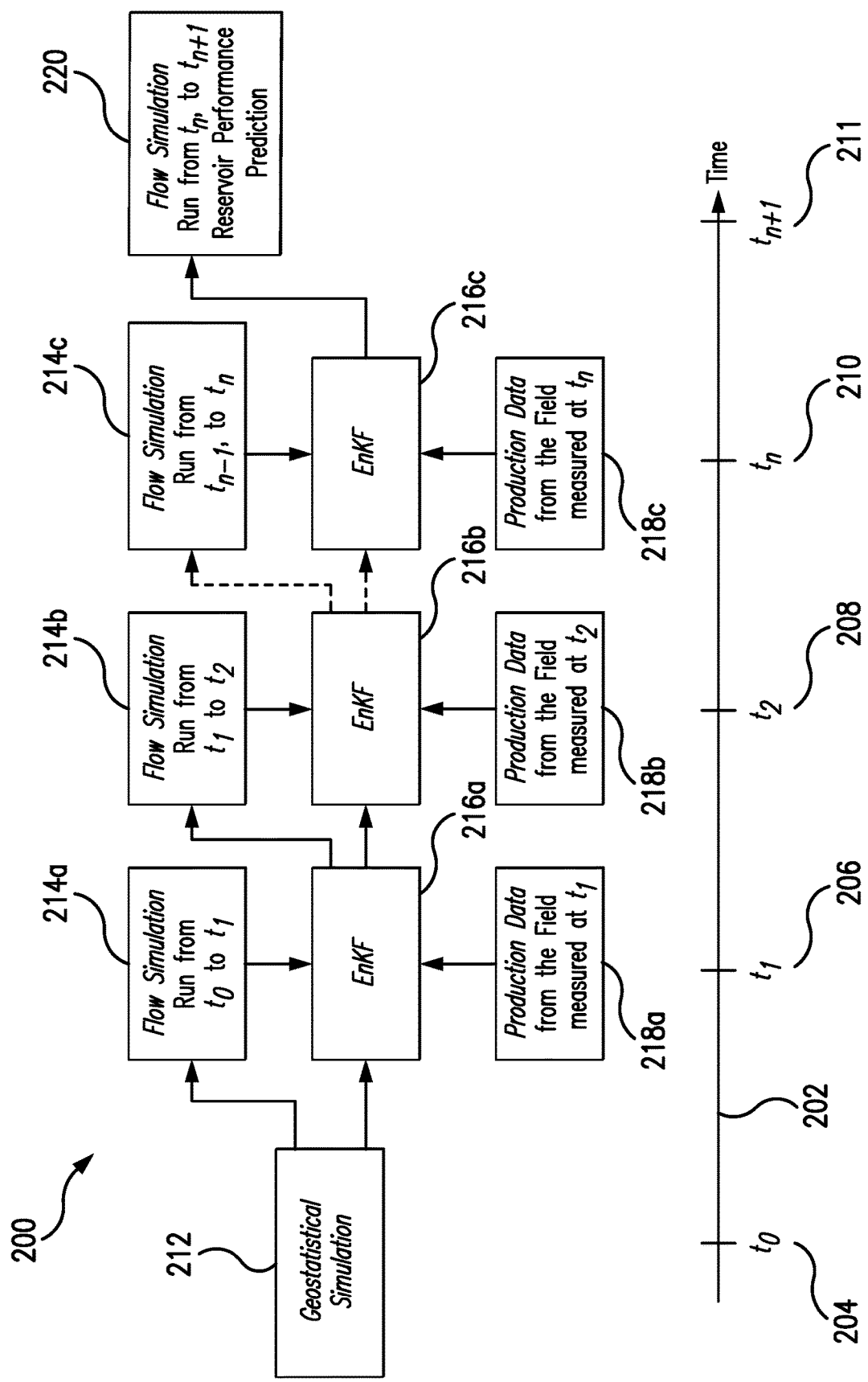
FIG. 2 illustrates an exemplary flow diagram for ensemble-based multi-scale history-matching and future reservoir performance prediction, in accordance with an embodiment of the present invention.

FIG. 2 illustrates a workflow 200 that may be performed by the production analysis and control system 140 described above, in accordance with embodiments of the present invention. The workflow 200 represents an EnKF-based multi-scale history-matching and future reservoir performance prediction method, or portion thereof, that may be used to simulate or model a 3D reservoir. A time axis 202 is also provided that denotes multiple instances of time in the simulation, including $t_0$ 204, $t_1$ 206, $t_2$ 208, $t_n$ 210 and $t_{n+1}$ 211.

In some embodiments, simulating or modeling a 3D reservoir involves using sequential Gaussian simulation, which is a geostatistical simulation method for continuous properties, and sequential indicator simulation, which is a geostatistical simulation method for categorical properties. This is depicted in the workflow 200 at step 212, where at least two realizations (i.e., real-world manifestations or representations) of existing well log data are generated and combined to create an ensemble of reservoir models. The ensemble of reservoir models defines the petrophysical properties of the 3D reservoir, such as permeability, and is often built using a number of realizations (e.g., 100 realizations) derived either from existing reservoir data and/or an updated ensemble of reservoir models.

Once an ensemble of reservoir models is generated, the production analysis and control system 140 uses an EnKF-based process to continuously and automatically update the generated ensemble of reservoir models. The updates correspond to the time steps along time axis 202. At each time step, the production process and control system 140 selectively incorporates new flow simulation results and production data. In other words, when the best new information is determined, the ensemble of reservoir models is updated with this information. Additional types of information can be evaluated and added to the model to supplement the production data. Such supplementary data can include, but is not limited to, geophysical data and geological data.

Referring still to FIG. 2, at steps 214a, 214b and 214c, the production analysis and control system 140 performs multiphase flow simulations for corresponding time periods from $t_0$ to $t_1$, from $t_1$ to $t_2$, and from $t_{n-1}$ to $t_n$, respectively. A numerical multiphase flow simulation for various saturation values can be performed in these steps to obtain simulated production of fluids from the formation over time and predictions of flow behavior, including absolute permeability as a function of saturation. The flow simulation results can also be used to understand the details of pore-scale multiphase flow dynamics, which can provide insight suggesting approaches for how to modify the absolute permeability versus saturation curve.

As noted above, during production operations, data is typically collected for analysis and/or monitoring of the operations. At steps 218a, 218b and 218c, the production analysis and control system 140 obtains production data from the field (e.g., oilfield 100) for corresponding time instances $t_1$, $t_2$, and $t_n$, respectively. Such data may include, but is not limited to, information regarding subterranean formations, equipment and/or other data.

At steps 216a, 216b and 216c, the production analysis and control system 140 assimilates flow simulation results (from 214a-214c) and production data (from 218a-218c) for the corresponding time instances $t_1$, $t_2$, and $t_n$ in real time. Each of the steps 216a-216c further involves selective updates to the ensemble of models using at least some of the collected flow simulation and/or production data. The resultant processing results provide quantitative information (e.g., about formation permeability) that may be used for history matching of the geological model. Uncertainties in the geological model are taken into account using a probabilistic approach to reduce the uncertainties in reservoir production forecasts. The resultant quantitative information is then used by the production analysis and control system 140 at step 220 to perform a flow simulation for at least one future time period (e.g., from $t_n$ to $t_{n+1}$) to obtain future reservoir performance prediction. By updating a geological model via an EnKF using both computer flow simulation data (from 214a-214c) and oil production data (from 218a-218c) simultaneously, future predictions of the reservoir behavior become more accurate. The updating step performed in 216a-216c (described in greater detail below) is based on the covariance matrix of the system under study.

Figure 3:
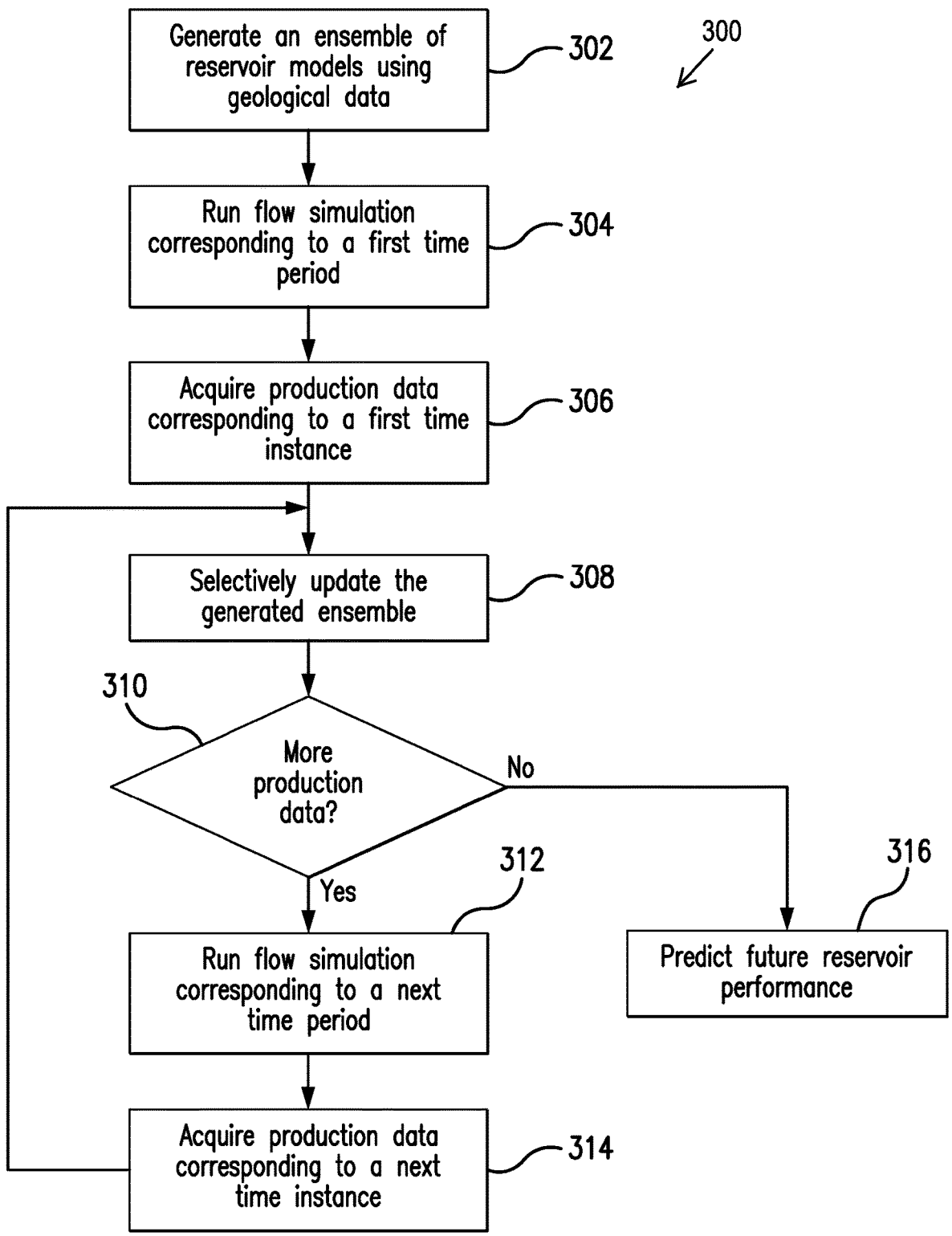
FIG. 3 illustrates an exemplary flow diagram for automatic history matching of a petroleum reservoir model with an EnKF, in accordance with an embodiment of the present invention.
Figure 4:
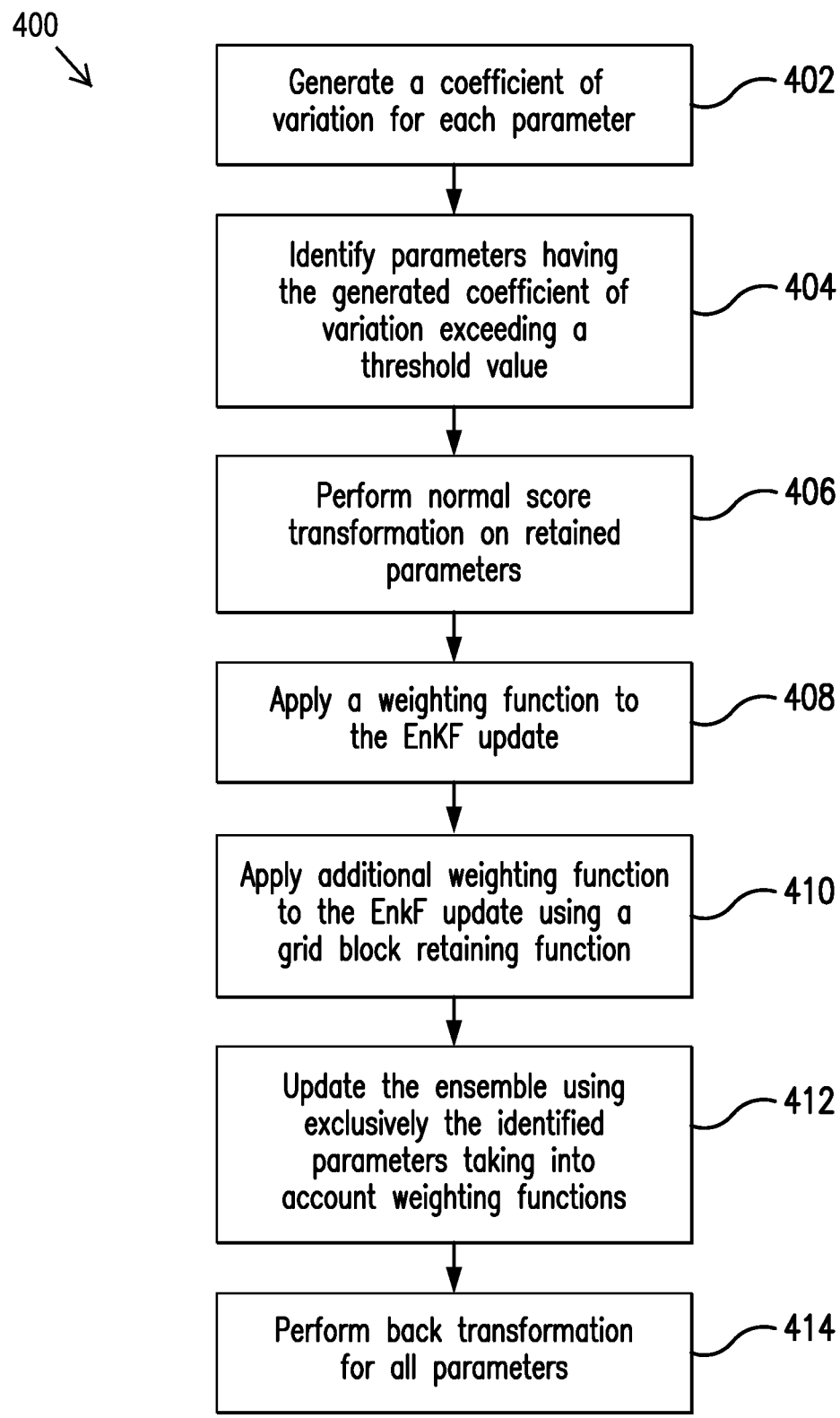
FIG. 4 illustrates an exemplary flow diagram for updating an ensemble of reservoir models, in accordance with an embodiment of the present invention.

FIG. 3 is a flow diagram 300 for the automatic history matching of a petroleum reservoir model using an EnKF performed by the production analysis and control system 140 of FIG. 1, in accordance with an embodiment of the present invention. FIG. 4 is a flow diagram 400 for the selective updates of the ensemble performed by the production analysis and control system of FIG. 1, in accordance with an embodiment of the present invention. Before turning to description of FIGS. 3-4, it is noted that the flow diagrams in these figures show examples in which operational steps are carried out in a particular order, as indicated by the lines connecting the blocks, but the various steps shown in the diagram of FIG. 4 can be performed in any order, or in any combination or sub-combination. It should be appreciated that in some embodiments some of the steps described below may be combined into a single step. In some embodiments, one or more additional steps may be performed.

Referring to FIG. 3, the production analysis and control system 140 starts the disclosed flow diagram 300 at step 302 by generating an ensemble of reservoir models using sequential Gaussian geostatistical simulation methods. As noted above, the ensemble of reservoir models is built using multiple realizations from existing reservoir data. The production analysis and control system 140 uses an EnKF to continuously update the generated ensemble of reservoir models at each time step by selectively incorporating new flow simulation results and production data.

At step 304, the production analysis and control system 140 performs flow simulation corresponding to a first time period (from $t_0$ to $t_1$). The flow simulation results can be used to understand flow behavior and production of fluids. For example, such flow simulation may help determine absolute permeability.

At 306, the production analysis and control system 140 obtains production data corresponding to a first time instance ($t_1$). As noted above, such production data may include, but is not limited to, information regarding subterranean formations, equipment and/or other data.

Next, at step 308, the production analysis and control system 140 selectively updates the generated ensemble using at least some of the flow simulation and/or production data collected at steps 304 and 306. In one embodiment, the EnKF can be used for update purposes, as described in greater detail below in conjunction with FIG. 4.

At step 310, the production analysis and control system 140 determines if more production data is available. In response to determining that more production data is available (decision block 310, "Yes" branch), steps 312 and 314 are performed. At step 312, the production analysis and control system 140 performs flow simulation corresponding to a next time period (from $t_1$ to $t_2$). Step 314 involves obtaining next batch of production data corresponding to the next time instance (e.g., $t_2$). Subsequently, the production analysis and control system 140 returns back to step 308 to selectively update the generated ensemble yet again with at least a portion of the newly acquired data. In response to determining that no more production data is available in a current batch (decision block 310, "No" branch), the production analysis and control system 140 predicts future reservoir performance (i.e., production of fluids) using the EnKF model information (step 316).

The conventional equation for the updating step of the EnKF is provided by the following Equation (1):

$$M^{upd}(t_n)=M^{orig}(t_n)+K(t_n)*(D(t_n)-H(t_n)*M^{orig}(t_n)) \quad (1),$$

where $M^{upd}(t_n)$ is the updated model, $M^{orig}(t_n)$ is the original model, $K(t_n)$ is the Kalman gain weighting matrix, $D(t_n)$ is the data matrix, and $H(t_n)$ is the observation matrix that relates data the data matrix to the corresponding model parameters in $M^{orig}(t_n)$. In order to optimize the update step, embodiments of the present invention propose intermediate computational steps that should be taken by the production analysis and control system 140 during the history matching procedure.

As mentioned, FIG. 4 shows a flow diagram 400 for selective updates of the ensemble that is performed by the production analysis and control system 140 of FIG. 1, in accordance with an embodiment of the present invention. It is noted that, although multiple data sets are used in the petroleum reservoir history matching process, not every available data set can improve the multi-data set history matching process. The disclosed embodiments provide a statistical learning framework that can correlate in-field parameter measurements with updated field parameters. Also, according to embodiments of the present invention, there should be a temporal change in the measured parameter and there should be variations between the realizations for those particular data sets to be used to improve the model. Accordingly, at step 402, the production analysis and control system 140 generates a coefficient of variation (CV) for each parameter using the following Equation (2):

$$CV(t_n)=\sigma(t_n)/m(t_n) \quad (2)$$

The coefficient of variation represented by Equation (2) is a good measure for the disclosed framework to screen the acquired production data for an EnKF update step. Thus, at step 404, the production analysis and control system 140 identifies all parameters having the generated coefficient of variation exceeding a predefined threshold value.

In one embodiment, the EnKF is improved by ensuring that the updated field parameters preserve the original shape of the original data distribution. Permeability field parameters can be highly skewed. For this reason, the production analysis and control system 140 optionally performs NST on retained parameters of a reservoir model realization, at step 406, prior to the updating step described below. The NST is done by matching quantiles of the original and the target normal distribution, as shown in Equation (3):

$$s(t_n)=G^{-1}[F(k(t_n))] \quad (3),$$

where $k(t_n)$ is a property, such as permeability, on which NST procedure is performed; and $s(t_n)$ is the normal score value. This step 406 ensures that geological and petrophysical representativeness of the updated field (e.g., permeability) still holds true.

Generally, multivariate Gaussian distributions can be defined in terms of a mean ($\mu$), which is a p×1 vector, and its invertible covariance matrix of size p×p. The covariance matrix may contain some spurious values that contaminate the calculation of the parameter (e.g., permeability) values being updated. These spurious parameter values may be present because of the way the values of the covariance matrix are stored and propagated in time, which is through the realizations in the ensemble. When the number of realizations is not large enough to compute stable entries in the covariance matrix, the Kalman weights ($K(t_n)$) may significantly affect the structure of the permeability field, causing the matrix to become unstable (i.e., errors to be amplified). To prevent this from happening, the production analysis and control system 140 optionally applies a weighting function to the EnKF updates at step 408. More specifically, at step 408, the production analysis and control system 140 applies additional weights ω (as shown in Equation 4) to the conventional equation for the updating step of the EnKF (represented by Equation (1) above). These weights ω are applied to smooth the effect of spurious covariance values for locations that are far away from the wells in the magnitude of the correlation range of the permeability field parameters under study. The Hadamard Product (entrywise multiplication) ∘ is performed in step 404, as shown in Equation (4):

$$M^{upd}(t_n)=M^{orig}(t_n)+\omega\circ K(t_n)*(D(t_n)-H(t_n)*M^{orig}(t_n)) \quad (4)$$

These additional weights ω are computed as shown in Equation (5) below and are based on the distance function b(i, j). The distance function values are computed according to Equation (6):

$$\omega(i, j) = \left(1.0 - \frac{b(i, j)}{\min(b, \forall i, j)}\right)^{\alpha}, i = 1, \ldots, N_x, j = 1, \ldots, N_y, \quad (5)$$

$$b(i, j) = \min\left(\sqrt{(x(i, j) - x_w)^2 + (y(i, j) - y_w)^2}, \forall w\right) \quad (6)$$

where i and j are the indices of the regular grid blocks in X and Y directions, respectively; $N_x$ and $N_y$ are the grid blocks in the same respective directions; w is a well index; and x and y are coordinates. Different points in the grid block may be weighted according to their distance relative to the well. The values assigned at the well locations are 1.0 and reduce down to 0.0 as the distance from the closest well increases.

The updating step of the EnKF of such a complicated model can be very computationally intensive. In addition, it can be substantially impossible to store all covariance values between all the combinations of modeled variable values in the modeled system. As such, according to some embodiments of the present invention, the production analysis and control system 140 optionally updates only part of the model representing a plurality of locations adjacent to the wells using a grid block retaining function at step 410. The grid block retaining function φ is applied according to Equation (7):

$$M^{upd}(t_n) = M^{orig}(t_n) + \varphi \circ \omega \circ K(t_n) * (D(t_n) - H(t_n) * M^{orig}(t_n)) \quad (7)$$

The values of grid block retaining function are computed according to Equation (8):

$$\varphi(i, j) = \begin{cases} 1, & \text{if } w(i, j) \geq \omega^{threshold} \\ 0, & f\omega(i, j) < \omega^{threshold} \end{cases} \quad (8)$$

In other words, the grid block retaining function takes on only two values (0 and 1), which are defined based on a predefined threshold value ($\omega^{threshold}$) of the weighting function. Thus, in Equation (7), the grid block retaining function φ is assigned the value of 1 for all points within some predefined distance from the well and is assigned the value of 0, as long as their distance is above the predefined distance from the well. It should be noted that the grid block retaining function can change over time within the modeled reservoir and can take more complex form.

Next, at step 412, the production analysis and control system 140 updates the model using exclusively the parameters identified in step 410, optionally taking into account weighting functions (steps 408, 410). In other words, the production analysis and control system 140 is equipped to select the data with covariance values higher than the predefined threshold (i.e., standardized local variations) for integration into the model and to discard data with covariance values lower than the predefined threshold. Steps 402, 404, 412 performed by the production analysis and control system 140 ensure that only new dynamic data which carry new information about the reservoir is assimilated into the model using the EnKF. The EnKF is applied in order to adjust the reservoir model and to compel it to meet the measured data. In the various embodiments, the range of different covariance value thresholds for steps 402, 404 can be selected in a variety of ways. Based on the updated ensemble of models, with assimilated production data from all available time instances, future reservoir behavior can be predicted by the production analysis and control system 140 with a high degree of accuracy. This facilitates managerial decision regarding reservoir development strategy. Once the updating is performed, a transformation of the updated field is performed back to its original distribution from the normal distribution according to Equation (9) (step 414):

$$k(t_n) = F^{-1}[G(s(t_n))] \quad (9)$$

Accordingly, as set forth above, the embodiments disclosed herein may be implemented in a number of ways. In general, in one aspect, the disclosed embodiments are directed to a method for history matching a model of a reservoir based on actual production data from the reservoir over time. The method includes, among other steps, the steps of (i) generating an ensemble of reservoir models using geological data representing petrophysical properties of a subterranean reservoir; (ii) locating one or more logging tools in the reservoir and acquiring production data corresponding to a first time instance from the subterranean reservoir; (iii) performing normal score transformation on the ensemble of reservoir models to transform original distribution of the ensemble of reservoir models into normal distribution of the ensemble of reservoir models and performing normal score transformation on the acquired production data to transform original distribution of the acquired production data into normal distribution of the acquired production data; (iv) updating the generated ensemble based on the transformed acquired production data using an EnKF; (v) transforming the updated generated ensemble back to the original distribution of the ensemble of reservoir models and transforming the acquired production data back to the original distribution of the acquired production data; and (vi) predicting future reservoir behavior based on the updated ensemble In one or more embodiments, the method for history matching a reservoir model based on actual production data from the reservoir over time may further include any one of the following features individually or any two or more of these features in combination: (a) prior to the updating step, applying a weighting function to the generated ensemble to stabilize sample covariance matrix; (b) the step of updating the generated ensemble further comprising selectively updating a portion of the ensemble using a grid block retaining function, the updated portion representing a plurality of locations surrounding one or more wells within the subterranean reservoir; (c) prior to the updating step, (1) generating a coefficient of variation for each parameter included in the transformed acquired production data, (2) identifying one or more parameters having the generated coefficient of variation exceeding a predefined threshold value and (3) updating the ensemble using exclusively the identified one or more parameters of the transformed acquired production data; and (d) the ensemble of reservoir models defining petrophysical properties, geomechanical properties and geochemical properties of the reservoir.

In general, in yet another aspect, the disclosed embodiments are related to a production analysis and control system. The system includes a production logging tool having a plurality of sensors thereon configured to acquire production data from a subterranean reservoir. The system further includes a processor in data communication with the production logging tool. The system also includes a memory device coupled to the processor. The memory device contains a set of instructions that, when executed by the processor, cause the processor to: (i) generate an ensemble of reservoir models using geological data representing petrophysical properties of a subterranean reservoir; (ii) acquire production data corresponding to a first time instance from the subterranean reservoir; (iii) perform normal score transformation on the ensemble of reservoir models to transform original distribution of the ensemble of reservoir models into normal distribution of the ensemble of reservoir models and perform normal score transformation on the acquired production data to transform original distribution of the acquired production data into normal distribution of the acquired production data; (iv) update the generated ensemble based on the transformed acquired production data using an EnKF; (v) transform the updated generated ensemble back to the original distribution of the ensemble of reservoir models and transform the acquired production data back to the original distribution of the acquired production data; and (vi) predict future reservoir behavior based on the updated ensemble.

In one or more embodiments, the production analysis and control system may further include any of the following features individually or any two or more of these features in combination: (a) the set of instructions that causes the processor to stabilize sample covariance matrix by applying a weighting function to the generated ensemble; (b) the set of instructions that causes the processor to update the generated ensemble further causing the processor to selectively update a portion of the ensemble using a grid block retaining function, the updated portion representing a plurality of locations surrounding one or more wells within the subterranean reservoir; (c) the set of instructions that causes the processor to (1) generate a coefficient of variation for each parameter included in the transformed acquired production data, (2) to identify one or more parameters having the generated coefficient of variation exceeding a predefined threshold value; and (3) to update the ensemble using exclusively the identified one or more parameters of the acquired production data; and (d) the ensemble of reservoir models defining petrophysical properties, geomechanical properties and geochemical properties of the reservoir.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A method for history matching a model of a reservoir based on actual production data from the reservoir over time, the method comprising steps of:
   generating an ensemble of reservoir models using geological data representing petrophysical properties of the reservoir;
   locating one or more logging tools in the reservoir;
   acquiring production data corresponding to a first time instance from the one or more logging tools located in the reservoir;
   performing normal score transformation on the ensemble of reservoir models to transform an original distribution of the ensemble of reservoir models into a normal distribution of the ensemble of reservoir models and performing normal score transformation on the acquired production data to transform an original distribution of the acquired production data into a normal distribution of the acquired production data;
   generating a weighting function comprising a plurality of weights using a distance function, wherein the distance function determines a distance from each of a plurality of points in at least one grid block to a well within the reservoir;
   updating the generated ensemble based on the transformed acquired production data using an ensemble Kalman filter (EnKF) and the weighting function;
   transforming the updated generated ensemble back to the original distribution of the ensemble of reservoir models and transforming the acquired production data back to the original distribution of the acquired production data; and
   performing a flow simulation for at least one future time period using the updated ensemble to obtain one or more predictions of future reservoir behavior comprising bottomhole pressures, fluid production rates, or formation permeability for the reservoir based on the updated ensemble.

2. The method of claim 1, wherein the step of updating the generated ensemble comprises selectively updating a portion of the ensemble using a grid block retaining function and wherein the updated portion represents a plurality of locations surrounding one or more wells within the reservoir.

3. The method of claim 1, further comprising, prior to the updating step, generating a coefficient of variation for each parameter included in the transformed acquired production data and identifying one or more parameters having the generated coefficient of variation exceeding a predefined threshold value, and wherein the updating step comprises updating the ensemble using exclusively the identified one or more parameters of the transformed acquired production data.

4. The method of claim 1, wherein the ensemble of reservoir models defines petrophysical properties, geomechanical properties and geochemical properties of the reservoir.

5. The method of claim 1, wherein the petrophysical properties include at least absolute permeability.

6. The method of claim 1, further comprising acquiring production data corresponding to a second time instance from the one or more logging tools located in the reservoir and updating the generated ensemble based on the production data acquired during the second time instance using the EnKF.

7. The method of claim 2, wherein the one or more wells comprise at least one of a production well or an injection well.

8. A production analysis and control system, the system comprising:
   a production logging tool having a plurality of sensors thereon configured to acquire production data from a reservoir;
   a processor in data communication with the production logging tool; and
   a memory device coupled to the processor, the memory device containing a set of instructions that, when executed by the processor, cause the processor to:
   generate an ensemble of reservoir models using geological data representing petrophysical properties of the reservoir;
   acquire production data corresponding to a first time instance from the reservoir;
   perform normal score transformation on the ensemble of reservoir models to transform an original distribution of the ensemble of reservoir models into a normal distribution of the ensemble of reservoir models and perform normal score transformation on the acquired production data to transform an original distribution of the acquired production data into a normal distribution of the acquired production data;

generate a weighting function comprising a plurality of weights using a distance function, wherein the distance function determines a distance from each of a plurality of points in at least one grid block to a well within the reservoir;

update the generated ensemble based on the transformed acquired production data using an ensemble Kalman filter (EnKF) and the weighting function;

transform the updated generated ensemble back to the original distribution of the ensemble of reservoir models and transform the acquired production data back to the original distribution of the acquired production data; and performing a flow simulation for at least one future time period using the updated ensemble to generate one or more predictions of future reservoir behavior comprising bottomhole pressures, fluid production rates, or formation permeability for the reservoir based on the updated ensemble.

9. The system of claim 8, wherein the set of instructions that causes the processor to update the generated ensemble further causes the processor to selectively update a portion of the ensemble using a grid block retaining function and wherein the updated portion represents a plurality of locations surrounding one or more wells within the reservoir.

10. The system of claim 8, wherein the set of instructions further causes the processor to generate a coefficient of variation for each parameter included in the transformed acquired production data and to identify one or more parameters having the generated coefficient of variation exceeding a predefined threshold value, and wherein the set of instructions that causes the processor to update the generated ensemble further causes the processor to update the ensemble using exclusively the identified one or more parameters of the acquired production data.

11. The system of claim 8, wherein the ensemble of reservoir models defines petrophysical properties, geomechanical properties and geochemical properties of the reservoir.

12. The system of claim 8, wherein the petrophysical properties include at least absolute permeability.

13. The system of claim 9, wherein the one or more wells comprise at least one of a production well, injection well.

* * * * *